United States Patent [19]

Schaible et al.

[11] Patent Number: 4,638,623
[45] Date of Patent: Jan. 27, 1987

[54] ROUND BALING PRESS

[75] Inventors: Siegfried Schaible, Singen; Edwin Schneble, Gailingen, both of Fed. Rep. of Germany

[73] Assignee: Kloeckner-Humboldt-Deutz AG Zweigniederlassung Fahr, Gottmadingen, Fed. Rep. of Germany

[21] Appl. No.: 617,189

[22] Filed: Jun. 4, 1984

[30] Foreign Application Priority Data

Jun. 8, 1983 [DE] Fed. Rep. of Germany ....... 3320715

[51] Int. Cl.$^4$ ............................................. A01D 39/00
[52] U.S. Cl. ........................................ 56/341; 100/89
[58] Field of Search ..................... 56/341, 343, 344; 100/88, 89; 198/834, 835

[56] References Cited

U.S. PATENT DOCUMENTS 4,092,914 6/1978 Burrough et al. ................... 56/341
4,198,804 4/1980 Konekamp et al. ................. 56/341

Primary Examiner—Paul J. Hirsch
Attorney, Agent, or Firm—Laurence R. Brown

[57] ABSTRACT

The round baling press with a pick-up device, having a binder device and a rolling chamber, on the side walls of which a plurality of rollers is mounted rotatablyin housing orifices, can be produced rapidly and more cheaply since the bearing housing orifices are open outwards for the radial insertion of the bearing shafts of the rollers, which are already provided with flanged bearing halves and coil guards. The protective hood placed upon the rollers exhibits side walls parallel to the side wall of the rolling chamber, which are provided with asymmetrical recesses so that the side walls of the protective hood can be connected to the rolling chamber simultaneously with the flanged bearing halves of the bearing shafts.

2 Claims, 5 Drawing Figures

ROUND BALING PRESS

TECHNICAL FIELD

The present invention relates to a round baling press with a pick-up device to pick up the crop material, with a binder device for the bales and with a rolling chamber, on the side walls of which a plurality of rollers is mounted rotatably in housing orifices, and also to a method of producing such a round baling press.

BACKGROUND ART

Round baling presses present a maximum of economy with reduction of effort for the personnel in harvesting. Round baling presses of this type are particularly suitable for pressing hay or straw and getting in withered hay for silage making, because they permit a high pressing density which is ideal for the fermentation process.

With round baling presses of this type, the crop material is picked up from the ground and compressed through an intake orifice during the gathering run, then tied by a binder device and discharged in the form of round bales through an outlet orifice, so that they can be stored in a simple manner, particularly where the available silo space is insufficient or where surplus fodder has to be taken in, or where small quantities of crop have to be kept for short periods.

The high price of such round baling presses, which is attributable particularly to the high labour outlay for production, is still a disadvantage.

The aim of the present invention is to develop a round baling press which is more economical to produce, and also to disclose a method of producing the same, whereby the production costs can be reduced.

DISCLOSURE OF THE INVENTION

Starting from a round baling press of the type specifically mentioned initially, it is proposed, in order to achieve the aim to develop a round baling press of this type, that the baling housing orifices along the external circumference of the rolling chamber side walls are open outwards for the radial insertion of the bearing shafts of the rollers.

Advantageously, the bearing shafts of the rollers are connected on each side to a preassembled flanged bearing half, the flanged bearing halves being connected by a part of their circumference to the rolling chamber side walls.

The totality of the rollers is preferably masked by a protective hood, the side walls of which extend parallel to the side wall of the rolling chamber, the side walls being provided with recesses which are arranged substantially in the region of the housing orifices for the rollers but which are constructed asymmetrically thereto, so that in each case at least one retaining bolt connects both a flanged bearing half and the side wall of the protective hood to the side wall of the rolling chamber.

In order to achieve the aim of disclosing a more economical production method, it is proposed that before the rollers are inserted into the outwardly open bearing housing orifices along the external circumference of the rolling chamber side walls, the bearing shafts of the rollers are provided with a coil guard which serves simultaneously as a flanged bearing half, that the rollers thus preassembled are then inserted radially into the bearing housing orifices and that the flanged bearing halves are then connected along a part of their circumference to the rolling chamber side walls of the rolling chambers and are simultaneously connected along a part of their circumference to the side wall of the protective hood.

In the case of the bearing arrangements hitherto known for such round bale presses, the rollers have to be introduced with their bearing shafts into the bearing housing orifices in a time-consuming and complicated manner, after which they have to be connected to the bearings and to the coil guard, in order that no fodder residues are retained in the bearings during operation of the rollers. At least two men are required for this assembly, because the conventional rollers with their bearing shafts are always wider than the rolling chamber width.

According to the baling press according to the invention, and the methods according to the invention for producing it, the bearings and the coil guard serving as sealing means are integrated so that the rollers can be provided with them beforehand. These preassembled rollers are inserted radially into the outwardly open housing orifices provided on the circumference of the side walls of the rolling chamber, and are then connected to the side walls with a few screws.

The asymmetrical configuration of the recesses on the side walls of the protective hood presents the advantage that during the assembly of the rollers with the side wall of the rolling chamber the protective hood can be conjointly fastened by a connecting bolt in each case, so that the production step hitherto necessary for that purpose is eliminated.

The invention therefore achieves the great advantage that the production time of such a round baling press can be considerably reduced, and its cost can be reduced due to the economy of production outlay.

BRIEF DESCRIPTION OF THE DRAWINGS

The invention is described more fully below with reference to the drawing, in which an advantageous exemplary embodiment of a round baling press according to the invention is illustrated, and wherein:

FIG. 1 illustrates a round baling press towed by a tractor to produce the bales, having a cylindrical rolling chamber oriented transversely to the travel direction, one side wall of which is designated 1. A plurality of mutually aligned rollers 2 are arranged on the circumference of the rolling chamber, with their axes extending parallel to the median axis of the rolling chamber for the circulation of the crop material. Of the rollers 2, some are mounted for free rotation, the remainder being driven. A housing 3 prevents the crop material from passing through the rollers 2 into the open, whilst the rear part 4 of the housing conjointly with the associated rollers can be pivoted away for the discharge of the bales. The front fixed part of the housing exhibits in the lower region an intake orifice 5 in the form of an induction gap extending parallel to the rolling chamber. Here the rollers 2 exhibit a greater mutual interval.

A pick-up device 6 extends forwards in the direction of travel from the intake orifice 5. The long-stalked crop material lying on the ground is picked up by the pick-up device 6 during the gathering run and transported into the rolling chamber, where it is coiled and pressed into a round bale by the rollers 2. After the bale is completed the drive is switched off and the bale is tied by a binder device, not shown. When the bale has been tied, the rear part 4 of the housing of the round baling press is hinged up, the bale is expelled and the housing is then closed again.

Figure 1:
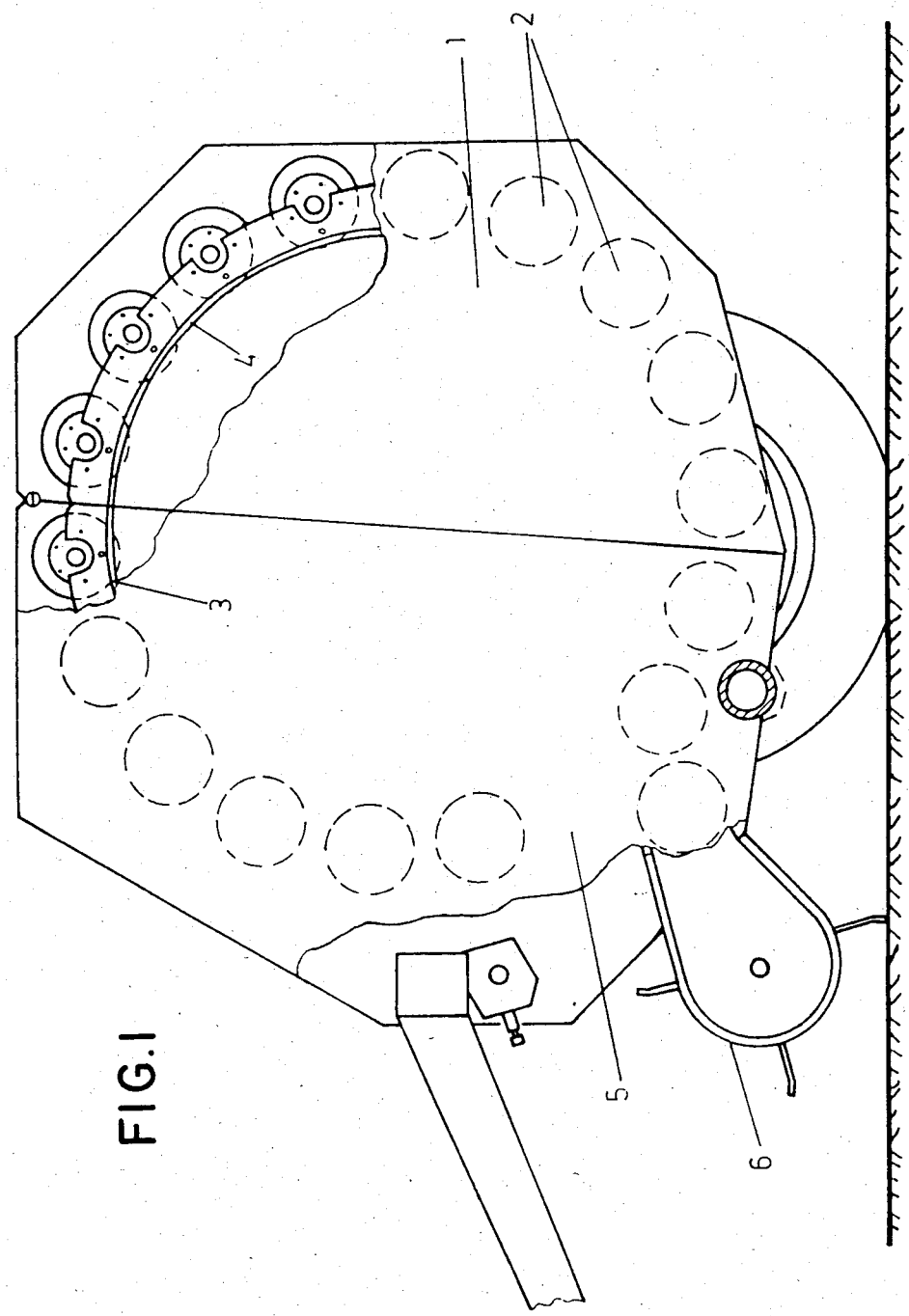
FIG. 1 shows a diagrammatic elevation of such a press.
Figure 2:
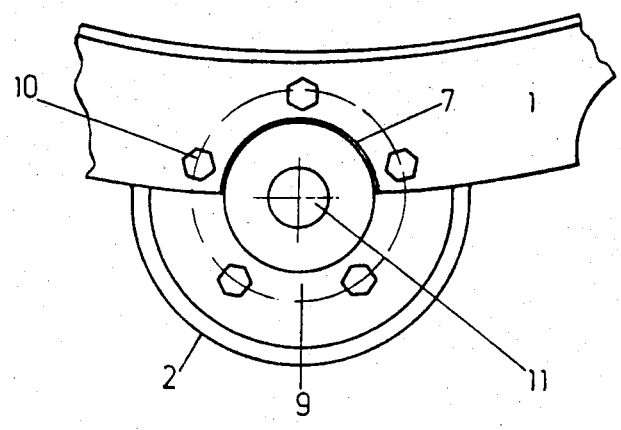
FIG. 2 shows a view on a larger scale of the bearings of the rollers in the rolling chamber side walls.
Figure 3:
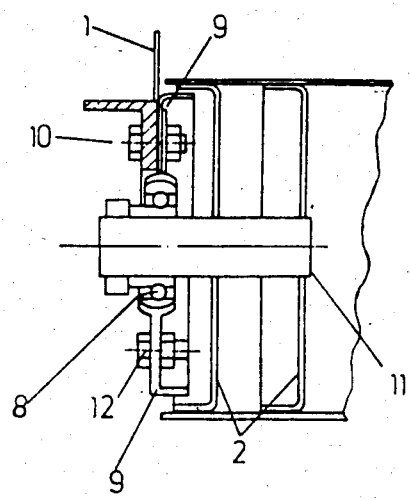
FIG. 3 shows a section through the left-hand end of the mounted roller.
Figure 4:
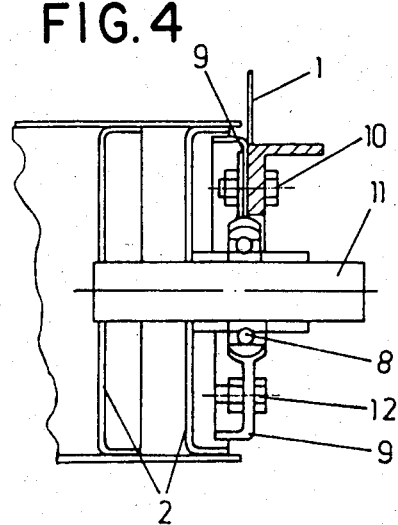
FIG. 4 shows a section of the right-hand end of the mounted roller.

As FIGS. 2 to 4 show in detail, the individual rollers 2 are mounted rotatably on the side walls 1 of the rolling chamber. In order to facilitate the installation of the rollers and thus to reduce the cost of the production process, the bearing housing orifices 7 in the side wall 1 (FIG. 2) are outwardly open orifices, into which the rollers 2 can be inserted radially with their bearing shaft and with the preassembled bearings 8 and with the flanged bearing halves 9. After the insertion of the preassembled rollers, the flanged bearing halves 9 are screwed by a few connecting bolts 10 along a part of their circumference to the side wall 1 of the rolling chamber.

FIG. 3 is a section through the left-hand end of such a roller bearing means. Here 8 designates for example a ball bearing or roller bearing for the rotatable reception of the bearing shaft 11. 12 designates a fastening bolt for the preassembly of bearing shaft and flanged bearing half, which simultaneously constitutes the coil guard for the roller 2.

Any adjustment of the bearing shafts thus preassembled in the round baling press during installation is eliminated. All that is required is the radial insertion into the bearing housing orifices 7 provided along the circumference of the rolling chamber, and the fitting of a few fastening bolts 10, whereby the labour outlay can be substantially reduced.

Figure 5:
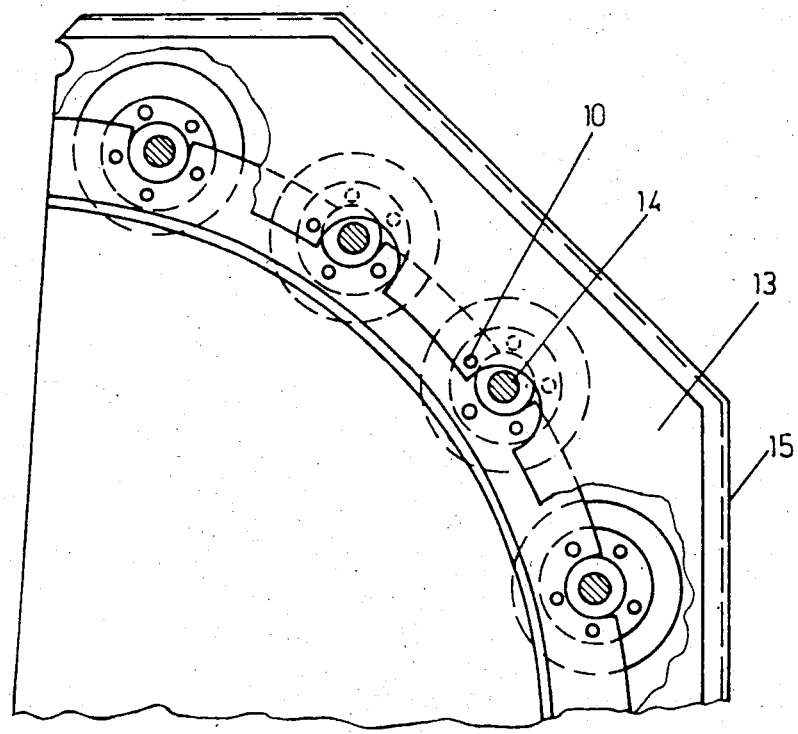
FIG. 5 shows a side elevation of the protective hood and its fastening means.

As FIG. 5 shows, the totality of the rollers 2 is masked by a protective hood 15, the side walls of which are designated 13 and extend parallel to the side wall 1 of the rolling chamber. The side walls 13 of the protective hood are provided with recesses 14 which are arranged substantially in the region of the housing orifices 7 for the rollers 2. These recesses 14 are constructed asymmetrically to the housing orifices 7, namely so that in each case at least one retaining bolt 10 connects both a flanged bearing half 9 and the side wall 13 of the protective hood 15 to the side wall 1 of the rolling chamber. The hitherto customary production step of the particular fastening of the protective hood 15 to the side wall 1 is thereby eliminated.

What is claimed is:

1. A round baling press with a pick-up device to pick up the crop material having a rolling chamber with side walls on which a plurality of rollers each mounted on bearing shafts are mounted rotatably in bearing housing orifices, characterised in that outwardly opening substantially semi-circular bearing housing orifices extend as indentations about the external circumference of a pair of spaced rolling chamber side walls into which the bearing shafts are radially inserted, rollers are provided with pre-assembled flanged bearing halves retained thereon and means connecting the flanged bearing halves, having been radially inserted into said bearing housing orifices, by a part of their circumference to the rolling chamber side walls, about said semi-circular orifice.

2. A round baling press with a pick-up device to pick up the crop material having a rolling chamber with side walls on which a plurality of rollers each mounted on bearing shafts are mounted rotatably in bearing housing orifices, characterised in that outwardly opening bearing housing orifices extend about the external circumference of a pair of spaced rolling chamber side walls into which the bearing shafts are radially inserted and are provided on each side with a pre-assembled flanged bearing half and means connecting the flanged bearing halves by a part of their circumference to the rolling chamber side walls, and further characterised in that the totality of the rollers is surrounded by a protective hood having side walls which extend parallel to the side wall of the rolling chamber and wherein the side walls are provided with recesses which are arranged substantially in the region of the housing orifices for the rollers but are constructed asymmetrically thereto, so that in each case at least one connecting bolt connects both a flanged bearing half and the side wall of the protective hood to the side wall of the rolling chamber.

* * * * *